UNITED STATES PATENT OFFICE.

ARTHUR D. LITTLE, OF BROOKLINE, MASSACHUSETTS, ASSIGNOR TO CELLULOSE PRODUCTS COMPANY, OF WILMINGTON, DELAWARE, A CORPORATION OF DELAWARE.

WAXED PAPER.

SPECIFICATION forming part of Letters Patent No. 691,952, dated January 28, 1902.

Application filed May 27, 1901. Serial No. 62,143. (No specimens.)

*To all whom it may concern:*

Be it known that I, ARTHUR D. LITTLE, of Brookline, in the county of Norfolk and State of Massachusetts, have invented an Improvement in Waxed Paper, of which the following is a specification.

This invention relates to a novel method of preparing waxed paper by which the wax is confined mainly to one surface of the paper, whereby a substantial saving of material is effected and a novel form of waxed paper produced.

In carrying out my invention I employ an emulsion composed, essentially, of paraffin or other wax or a mixture of waxes and viscose prepared after the general plan set forth in United States Patent No. 520,770.

I find that an emulsion suitable for the purposes of my invention may be made by melting two parts of soap, preferably made from tallow, with a little water and adding thereto while still kept hot small quantities of paraffin with constant stirring until, say, forty parts of paraffin have been thus added and thoroughly incorporated in the mixture. The heating is then discontinued and, say, two hundred parts of water added gradually, the stirring being continued until all the water has been worked in. Then an equal quantity of a solution of viscose prepared after the manner set forth in United States Patent No. 520,770 is added, such viscose solution containing, say, about ten per cent. of cellulose, as viscose. The viscose solution and the wax emulsion are then thoroughly mixed in the cold, and the mixture or emulsion produced is then ready for application to the paper. I prefer to use unsized paper and to apply the above mixture or emulsion on a coating-machine after the manner followed in coating with clay. The presence of the viscose, however, renders the use of vegetable-fiber brushes advisable on the coating-machine, and direct contact of the coating mixture with metal should be avoided.

The coated paper may be dried in loops or upon drums. In either case the heating should be sufficient to decompose the viscose, in order that the paraffin or wax may be held upon the paper by the film of cellulose recovered through the decomposition of the viscose, the recovery of the cellulose being accomplished substantially after the manner set forth in United States Patent No. 604,206. The completion of the decomposition is shown when bits of the paper yield to water only inorganic salts. When the decomposition of the viscose has been effected, the paper is or may be washed, preferably, in the continuous way, as in case of parchment-paper and similar products. It is then dried and finally passed between hot rolls to melt and spread the paraffin held upon the paper by the recovered cellulose.

I claim—

1. As a new article of manufacture paper having a coat or face composed of recovered cellulose and paraffin, substantially as described.

2. A mixture for coating paper consisting of an emulsion of paraffin and viscose, substantially as described.

In testimony whereof I have signed my name to this specification in the presence of two subscribing witnesses.

ARTHUR D. LITTLE.

Witnesses:
B. J. NOYES,
JOHN W. DECROW.